Jan. 27, 1942. J. G. HEFFERNAN 2,271,225
WINDSHIELD CLEANING UNIT
Filed April 10, 1940 2 Sheets-Sheet 1

INVENTOR
James G. Heffernan
by
ATTORNEY

Jan. 27, 1942. J. G. HEFFERNAN 2,271,225
WINDSHIELD CLEANING UNIT
Filed April 10, 1940 2 Sheets-Sheet 2
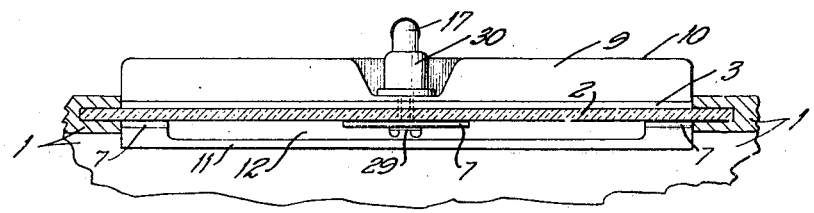
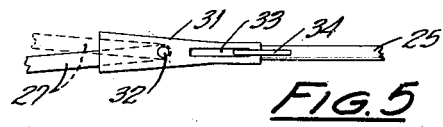
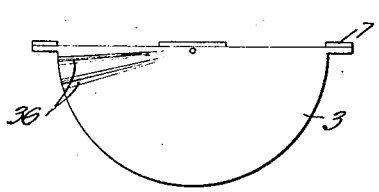
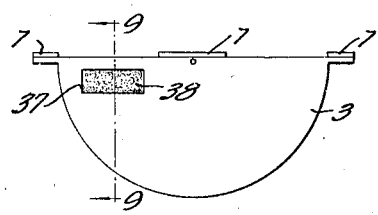
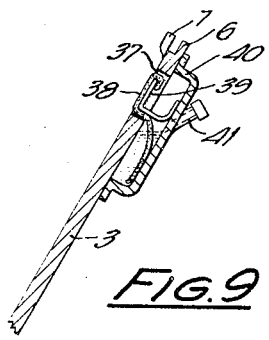
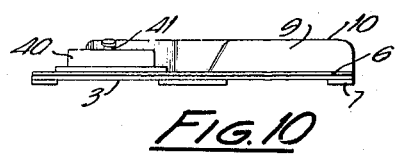
INVENTOR
James G. Heffernan
by
ATTORNEY Patented Jan. 27, 1942

2,271,225

UNITED STATES PATENT OFFICE 2,271,225

WINDSHIELD CLEANING UNIT

James G. Heffernan, Mechanicville, N. Y.

Application April 10, 1940, Serial No. 328,887

10 Claims. (Cl. 15—250.5)

It is quite difficult to keep the windshield of a motor vehicle clean and unobscured when, for example, snow packs and adheres to the windshield and when merely an ordinary reciprocating type of windshield wiper is employed. The continued packing of snow often prevents further operation of the wiper. Furthermore, under certain conditions, rain falls upon the windshield and freezes whereupon the ordinary windshield wiper is of no avail.

It is, therefore, broadly speaking, the primary object of my invention to provide a unit comprising in combination a windshield wiper and means for warming the blades of the wiper and removing snow and like frozen or adhering matter therefrom. Another object resides in providing, in a unit of the foregoing character, a wiper which is arranged continuously to rotate in one direction over and in contact with the windshield and with a means for heating the wiper and removing adhering matter therefrom.

A wiper element which is arranged continuously to rotate in one direction is desirable since such an arrangement appreciably eliminates the noise occurring in wipers of the reciprocating type at the end of each stroke and, moveover, a wiper which rotates in the manner herein contemplated will not merely move the snow to one side and pack it there upon the windshield.

More particularly, an object of my invention resides in providing a plate-like element disposed with a surface thereof substantially co-planar with the surface of the windshield, a wiping element or wiper arranged to move over and in contact with a surface of the plate-like element and windshield and means for heating the plate-like element. Another object resides in providing a heating chamber adjacent the base of a windshield, said chamber having an interior surface substantially co-planar with the surface of the windshield, means for supplying heat to the interior of said chamber, and a wiper arranged to move over and in contact with the interior surface of said chamber and a surface of said windshield.

Another object lies in providing the plate-like element, above referred to, with means for vibrating or jarring the wiper blade whereby forcibly to remove adhering matter therefrom.

Still another object lies in providing a plate-like element of the foregoing character having disposed substantially flush with the surface thereof, a pad of liquid-absorbent character and a reservoir adapted to contain and supply a liquid of low freezing point to said pad; said pad being arranged in the path of movement of the wiper blade so that the wiper, passing thereover, may be moistened and will transfer liquid to the windshield for cleaning purposes.

With these and other objects in view, my invention includes the novel elements and the combinations and arrangements thereof described below and illustrated in the accompanying drawings in which, Fig. 1 is a fragmentary elevation view, partially in section, illustrating a preferred form of my invention in association with the windshield of a motor vehicle;

Fig. 4 is a fragmentary, sectional plan view taken in about the plane 4—4 of Fig. 1;

Figs. 5 and 6 are enlarged, fragmentary plan and elevation views, respectively, of a pivotally connected wiper blade and arm;

Fig. 7 is an elevation view, to a reduced scale, of the plate-like element showing a modified arrangement thereof;

Fig. 8 is a view similar to Fig. 7 but illustrating a liquid-absorbent pad associated with the plate-like element;

Fig. 9 is an enlarged, fragmentary sectional view taken at about the plane 9—9 of Fig. 8; and Fig. 10 is a plan view of the arrangement illustrated in Fig. 8.

Figure 1:
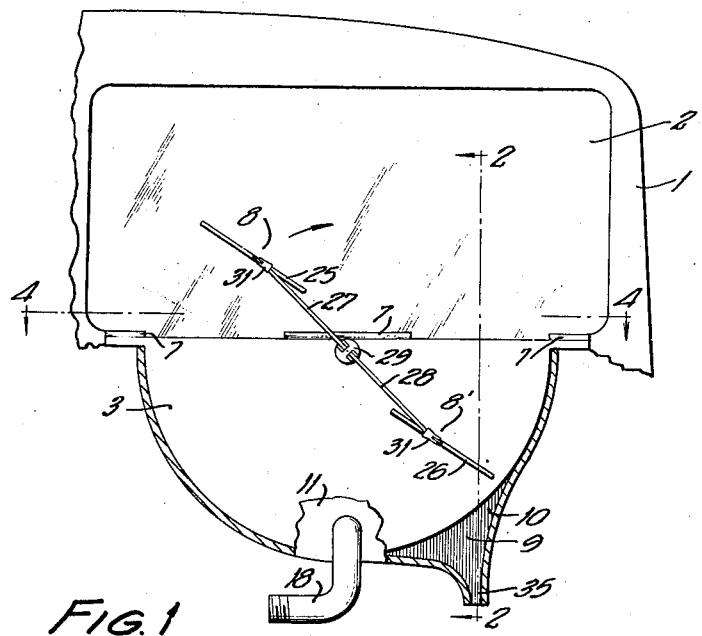
Figure 2:
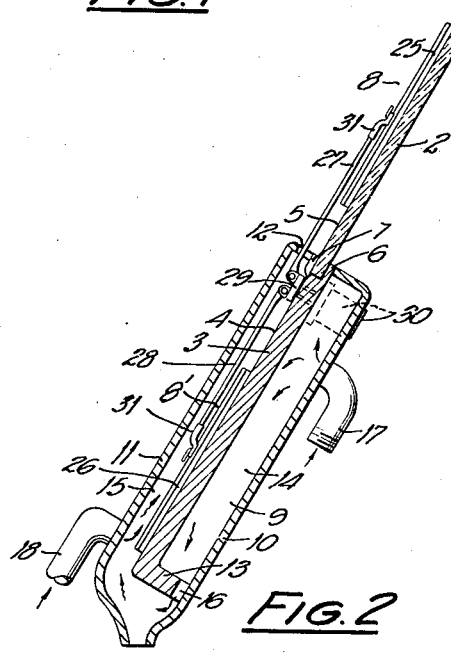
Fig. 2 is a fragmentary sectional view taken in about the plane 2—2 of Fig. 1.

Referring to the drawings and first to Figs. 1, 2 and 4, I indicates generally a motor vehicle body provided with a windshield 2. Adjacent the base of the windshield is mounted a plate-like element 3, the surface 4 of which is preferably, substantially co-planar with the surface 5 of the windshield 2. The element 3 is provided at its upper edge with a shoulder 6 which may extend across the back of the windshield and spaced shoulders 7 which are designed to abut the front of the windshield in spaced zones as illustrated in Fig. 1. With this construction, the base of the windshield abuts the top of the plate-like element 3 with the surfaces 4 and 5 thereof substantially flush with each other so that the wiper elements indicated generally at 8 and 8' may be freely rotated over and in contact with said surfaces. The element 3 may be generally semi-circular in shape and is preferably disposed within a heating chamber indicated generally at 9. The chamber 9 is defined by a rear wall 10, a front wall 11 and side walls which preferably conform to the curvature of the plate-like element 3. The top of the chamber may be closed by bending over the front and rear walls, as shown, and welding the overbent portions to opposite sides of the plate-like element 3. The overbent portion of the front wall 11 is preferable recessed to form an opening 12 adjacent the base of the windshield through which the wipers and the associated arms may pass and through which warm air may escape and pass upwardly along the face of the windshield as hereinafter described.

The element 3 may be overbent as at 13 and secured to the rear wall 10 to subdivide the chamber 9 into a rear heating compartment 14 and a front compartment 15 and, preferably, an opening 16 is provided to afford communication between the compartments at the bottoms thereof. Hot air is supplied through the inlet or nipple 17 which communicates with the interior of the rear compartment 14 preferably near the top thereof and hot air is also supplied through the inlet or nipple 18 which communicates with the compartment 15 preferably in a zone opposite the lower end of the plate-like element 3. By providing the two conduits 17 and 18, hot gases or air, which is heated by the exhaust gases from the engine of the vehicle, may simultaneously flow through these conduits and directly into the compartments 14 and 15 and, of course, the hot air within the compartment 14 may discharge through the opening 16 and into the lower end of the compartment 15. The hot air so supplied to the compartment 14 is primarily intended for heating the plate-like element 3 and the hot air supplied directly to the compartment 15 not only heats the element 3 as it passes upwardly therealong but also upon escaping through the opening 12 in the top of the compartment passes over and heats the face of the windshield.

Figure 3:
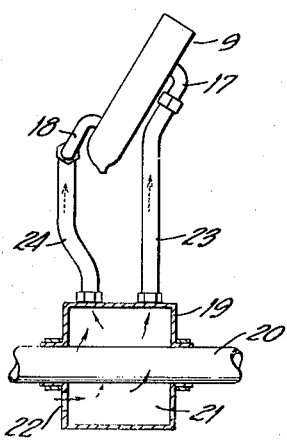
Fig. 3 illustrates somewhat diagrammatically one manner in which the heating chamber of my invention may be supplied with hot air.

The compartments of chamber 9 may be connected with a suitable hot air supply as illustrated in Fig. 3. In this illustrative arrangement, a casing 19 is placed about the exhaust manifold 20 to form a chamber 21 to which air is supplied through the port 22. The air so admitted to chamber 21 is heated as it passes about and in contact with the exhaust manifold and flows upwardly through conduits 23 and 24 which are connected, respectively, between the chamber 21 and the nipples 17 and 18. Conduits 23 and 24 may be of the flexible type and may be secured, for example, by couplings to the nipples 17 and 18 and to similar nipples projecting from the casing 19.

The wiper elements 8 and 8' comprise the wiper blades 25 and 26 which are mounted on the arms 27 and 28. These arms are suitably connected to and supported on the head 29 of the shaft of an electric motor 30. Motor 30 is designed to rotate the arms and the wiper blades over and in contact with the face of the windshield and the surface of the plate-like element 3. I prefer so to arrange the motor that it will continuously drive the wiper elements in one direction as, for example, in the direction of the arrow appearing in the drawings.

Furthermore, I prefer so to connect the wiper blades and arms that the blades may pivot, at least to a small degree, relative to the arms. One manner in which a pivotal connection between the wiper arms and blades may be accomplished is illustrated in Figs. 5 and 6. The arrangement shown comprises a connector 31 which is interiorly tapered at one end to receive the wiper arm 27 which is pivotally secured therein by means of the rivet 32. The connector 31 is also provided with the usual slot 33 through which the finger 34, which is mounted on the top of the wiper blade, may be passed in fastening the arm and blade together. Furthermore, the pivotal connection between the arm and blade is preferably located closer to the inside end, or that end of the blade nearest the shaft of the motor 30, than the outer end of the blade. The wiper blades and arms are preferably connected together in this manner so that the blades will assume a small angle relative to the arms as the arms are rotated and, by placing the pivotal connection closer to the inner ends of the blades than to the outer ends thereof, the inner end of the blades will assume a position forwardly of the outer ends thereof with respect to the direction of movement of said blades. In this position, the blades will more easily and efficiently remove, for example, snow and other matter which may adhere to the windshield.

In the operation of the preferred arrangement of my invention, above described, air, which may be heated by the exhaust manifold, flows to the compartments 14 and 15 and heats the plate-like element 3. As the windshield wipers are rotated they alternately pass over and in contact with the surfaces of the element 3 and the windshield. Hence, not only will the heated plate liquefy frozen or semi-frozen matter which may adhere to the wiper blades and thereby cause it to drip from the blades but it will also impart heat to said blades which, in moving over the windshield, will decrease the possibility of ice formation or the adherance of snow to the front of the windshield. Snow or ice which is thus cast from the wipers will flow downwardly over the plate-like element and may be discharged from the compartment 15 through the discharge opening 35 which is provided in the bottom thereof.

In the embodiment of my invention shown in Fig. 7, the plate-like element 3 is provided with one or a plurality of generally radially extending notches or grooves 36 which are preferably arranged adjacent the upper edge of the plate in a position where the wiper blades will pass thereover after passing over the major portion of the heated element and immediately before moving upon the windshield. The grooves 36 will vibrate or jar the wipers and remove adhering matter therefrom which has been melted or partially melted by the heat of the element 3 and the chamber.

In the further modified form of my invention shown in Figs. 8, 9 and 10, I have provided a plate-like element 3 with an opening 37 in which is arranged a pad of liquid-absorbent material such as wicking 38 and this material preferably lies, in part, substantially flush with the surface of the element 3. The wicking may be supported and secured at one end to a bracket 39 which is mounted upon the interior wall of a container 40. In the embodiment illustrated, the container 40 is suitably secured to the element 3, as by welding, with the sides thereof surrounding the opening 37 in the element 3 whereby to form with said element a receptacle which is adapted to contain a liquid. The lower end of the wicking is arranged to depend within the receptacle and in the liquid therein which is preferably one having a low freezing point. A filling spout 41 surmounted by a cap may be provided through which access may be had to the interior of the receptacle for filling purposes. With this arrangement, liquid will be supplied to the wicking which is exposed through the aperture 37 in the element 3 and, since the aperture is arranged in the path of movement of the wipers, these wipers will pass over the wicking and wipe liquid therefrom. The liquid will serve to clean the windshield and also to prevent matter such as snow from adhering thereto and to the wiper blade. Obviously, the plate-like element 3 may be arranged to include both of the embodiments illustrated in Figs. 7 and 8 of the drawings.

It will be noted that in the operation of my invention, the wiper blades will not merely move snow, for example, from one zone and pack it on other parts of the windshield but, on the other hand, will entirely remove from the windshield practically all of the snow which lies in the path of the blades. The heated plate liquefies frozen matter which may adhere to the blades and the rising hot air which escapes from the front heating compartment will warm the windshield and prevent water from freezing thereon.

While I have described my invention in its preferred embodiment it is to be understood that the words which I have used are words of description rather than of limitation and that changes within the purview of the appended claims may be made without departing from the true scope and spirit of my invention in its broader aspects.

What I claim is:

1. In combination, a motor vehicle comprising a vehicle body having a transparent windshield framed thereby, a plate-like element mounted within said body and beneath the transparent portions of said windshield and adjacent the base of said windshield with its surface in co-planar relationship with a surface of said windshield, whereby a wiper may pass smoothly from one of said surfaces to the other, a wiper rotatably mounted at the base of said windshield and adapted to move over and in contact with the surfaces of said windshield and plate-like element, and means for supplying heat to the surface of said plate-like element traversed by said wiper.

2. In combination, a motor vehicle comprising a vehicle body having a transparent windshield framed thereby, a plate-like element mounted within said body and beneath the transparent portions of said windshield and adjacent the base of said windshield with its surface in co-planar relationship with a surface of said windshield whereby a wiper may pass smoothly from one of said surfaces to the other, a wiper rotatably mounted at the base of said windshield and adapted to move over and in contact with the surfaces of said windshield and plate-like element, and means for supplying heat to said plate-like element, said windshield and plate-like element being arranged to permit heat freely to pass from said plate upwardly along the surface of the windshield traversed by said wiper whereby to warm all portions of the transparent portions of said windshield which are traversed by the wiper.

3. In a motor vehicle having a transparent windshield, means defining a heating chamber disposed beneath the transparent portions of said windshield and adjacent the base of said windshield and having a wall thereof disposed with its surface in substantially co-planar relationship with a surface of said windshield, a wiper mounted to move over and in contact with the surface of said windshield and the surface of said wall of said chamber and means for supplying heat to the interior of said chamber.

4. In a motor vehicle having a transparent windshield, means defining a heating chamber disposed beneath the transparent portions of said windshield and adjacent the base of said windshield and having a wall thereof disposed with its surface in substantially co-planar relationship with a surface of said windshield, a wiper rotatably mounted to move over and in contact with the surface of said windshield and the surface of said wall of said chamber, means for supplying heat to the interior of said chamber and means for rotating said wiper continuously in one direction whereby it will alternately move over the interior surface of said chamber and over the surface of said windshield.

5. In a motor vehicle having a windshield, means defining a heating chamber disposed adjacent the base of said windshield, a plate-like element arranged within said chamber with its surface substantially co-planar with a surface of said windshield, said element subdividing said chamber into two compartments, means for supplying heat to both of said compartments and a wiper mounted to move over and in contact with the surfaces of said element and windshield.

6. In a motor vehicle having a windshield, a plate-like element mounted adjacent the base of said windshield and with its surface substantially co-planar with a surface of said windshield, a wiper so mounted that it may be moved over and in contact with the surfaces of said windshield and plate-like element, means for supplying heat to said plate and means associated with said element for vibrating said wiper whereby to free it of adhering matter.

7. In a motor vehicle having a windshield, means defining a heating chamber disposed adjacent the base of said windshield, a plate-like element arranged within said chamber with its surface substantially co-planar with a surface of said windshield, said element subdividing said chamber into two compartments, an arm rotatably mounted adjacent the base of said windshield, a wiper element positioned on said arm and means for rotating said arm, said arm being so mounted as to move said wiper element over and in contact with the surfaces of said plate-like element within said chamber and said windshield, and means for supplying heat to both of said compartments.

8. In a motor vehicle having a windshield, means defining a heating chamber disposed adjacent the base of said windshield, a plate-like element arranged within said chamber with its surface substantially co-planar with a surface of said windshield, said element subdividing said chamber into two compartments, a wiper mounted to move over and in contact with the surfaces of said element and windshield and means for simultaneously supplying hot air directly to the interiors of said compartments.

9. In a motor vehicle having a windshield, a plate-like element mounted adjacent the base of said windshield and with its surface substantially co-planar with a surface of said windshield, a wiper so mounted that it may be moved over and in contact with the surfaces of said windshield and plate-like element, means for supplying heat to said plate, a liquid-absorbent material mounted substantially flush with the surface of said plate-like element and in the path of movement of said wiper thereover and means forming a receptacle adapted to contain a liquid having a low freezing point, said material extending within said receptacle whereby said liquid will be supplied to that portion of said material exposed to and in the path of movement of said wiper.

10. In a motor vehicle having a windshield, a plate-like element mounted adjacent the base of said windshield and with its surface substantially co-planar with a surface of said windshield, a wiper so mounted that it may be moved over and in contact with the surfaces of said windshield and plate-like element and means for supplying heat to both sides of said plate-like element.

JAMES G. HEFFERNAN.